(12) United States Patent
Gerges (10) Patent No.: US 9,186,603 B2
(45) Date of Patent: *Nov. 17, 2015

(54) SLUDGE PROTECTOR CANOPY BAFFLE SYSTEM (71) Applicant: Hany Zarif Gerges, Danville, CA (US)

(72) Inventor: Hany Zarif Gerges, Danville, CA (US)

(*) Notice: Subject to any disclaimer, the term of this patent is extended or adjusted under 35 U.S.C. 154(b) by 116 days.

This patent is subject to a terminal disclaimer.

(21) Appl. No.: 13/628,049

(22) Filed: Sep. 27, 2012

(65) Prior Publication Data

US 2014/0083932 A1 Mar. 27, 2014

(51) Int. Cl.
B01D 21/24 (2006.01)
B01D 21/00 (2006.01)
B01D 21/08 (2006.01)

(52) U.S. Cl.
CPC ........ B01D 21/2405 (2013.01); B01D 21/0003 (2013.01); *B01D 21/0042* (2013.01); *B01D 21/0045* (2013.01); *B01D 21/08* (2013.01)

(58) Field of Classification Search
CPC ................ B01D 21/2405; B01D 21/0003
USPC .................................................. 210/519, 521
See application file for complete search history.

(56) References Cited

U.S. PATENT DOCUMENTS

| 4,722,800 A * | 2/1988 | Aymong ................ 210/802 |
| 4,840,732 A * | 6/1989 | Rawlins ................ 210/306 |
| 7,717,275 B2 * | 5/2010 | Gerges ................ 210/519 |
| 2005/0006320 A1 * | 1/2005 | Use et al. ................ 210/791 |
| 2010/0193423 A1 * | 8/2010 | Schaller et al. ................ 210/232 |

FOREIGN PATENT DOCUMENTS

| GB | 2075856 A | * 11/1981 |
| WO | WO 2008094225 A1 | * 8/2008 |

* cited by examiner

Primary Examiner — Heidi Kelley
Assistant Examiner — Eric McCullough (57) ABSTRACT A sludge protector canopy baffle system for use in a clarifier tank with a tank bottom, and peripheral vertical wall bounding the interior of the tank is formed by a plurality of individual perforated baffles interconnected and supported by other components of the tank forming a rigid ceiling of sloped and curved perforated baffles allowing the incoming water to pass on its surface minimizing sludge re-suspension and directing the flow on top of the blanket in the settling zone of the tank. Each baffle has a curved surface in the lateral direction to allow drainage of solids and openings to allow gas release and water flow. The baffles are interconnected along the length by cross connectors to ensure rigidity. The resulting system provides a sludge protector canopy baffle system by which the water flows uniformly through the tank without disturbing or re-suspending settled or thickened sludge and overall tank performance is enhanced.

20 Claims, 7 Drawing Sheets

SLUDGE PROTECTOR CANOPY BAFFLE SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not Applicable

BACKGROUND OF THE INVENTION

1. Field of the Invention

This invention relates to a system of interconnected sludge protector canopy perforated baffles for use in solids separation and settling tanks, the baffle system consisting of a plurality of interconnected perforated baffles attached to other components of the tank and forming a rigid ceiling of sloped and curved perforated baffles covering the sludge layer at the bottom of the tank.

2. Description of the Related Art

The present invention relates to a baffle system for a tank for separation of solids from the water by gravitational forces in water and wastewater treatment. The tank where the inventive baffle device is used is typically circular, square or rectangular in shape.

In water and wastewater treatment where sedimentation tanks, also known in the art as clarifiers or settling tanks, are used, the efficiency of the tanks is governed by the amount suspended matter removed and the quality of the sludge produced from the bottom of the tank. The energy and momentum of the flow entering the tank as well the density currents resulting from the difference in specific gravity between suspended matter and water or the differential temperature between the atmosphere and the water contained in the tank represent a major deterrent to the tank removal efficiency and quality of the sludge produced. High level of energy of the flow entering the tanks and/or strong density currents create strong water fall that disturbs the sludge blanket leading to sludge re-suspension and deterioration of tank performance.

Representative examples of prior art of baffles and the like are disclosed in U.S. Pat. No. 2,702,124 to Stengel, U.S. Pat. No. 3,175,692 to Edgerton, U.S. Pat. No. 3,486,628 to Darby, U.S. Pat. No. 3,966,617 to Zaenkert, U.S. Pat. No. 4,270,676 to Green, U.S. Pat. No. 4,985,148 to Monteith, U.S. Pat. No. 5,378,378 to Meurer, U.S. Pat. No. 5,384,049 to Murphy, U.S. Pat. No. 5,714,068 to Brown, U.S. Pat. No. 6,099,743 to Pederson, U.S. Pat. No. 6,276,536 to Esler and U.S. Pat. No. 6,800,209 to Wright. All these inlet designs focused on dissipating the energy of the incoming water to improve settleablity of the sludge without providing protection to the settled and thickened sludge or prevention of sludge re-suspension.

Other representative examples of prior art are disclosed in U.S. Pat. No. 7,637,379 to Pophali et al., U.S. Pat. No. 7,981,299 to Triglavcanin, U.S. Pat. No. 8,021,559 to Triglavcanin, U.S. Pat. No. 8,087,518 to Kwon et al., and U.S. Pat. No. 8,182,701 to Lake. Some of these inventions presented apparatus for improving thickening of sludge or complete clarifier feed structures comprised of a series of energy dissipating, flocculation and short circuiting baffles. None of the above mentioned inventions was intended to protect sludge blanket only neither could be applied to all tank shapes, circular, rectangular or square.

Moreover, no prior art reference discloses a plurality of interconnected individual perforated baffles sloped in all directions with each baffle containing gas release and water flow-through openings and curved in lateral direction to allow drainage of solids and supported on one or both ends to a structural element within circular, rectangular or square tank.

It is, therefore, an object of the present invention to provide a system of plural, interconnected perforated baffles, supported from the circular feed well, center column and/or energy dissipating tub in case of circular tank or alternatively, attached to the tank inlet wall in case of non-circular tank, forming a rigid ceiling of curved baffle system covering the sludge blanket.

BRIEF SUMMARY OF THE INVENTION

The present invention provides a sludge protector baffle system designed to satisfy the aforementioned need. The sludge protecting baffle system improves performance of the sedimentation tank by minimizing the amount of sludge re-suspended from the sludge blanket at dry and wet weather events leading to lower level of solids exiting the tank and higher sludge concentrations.

The present invention presents a sludge protector baffle system forming a rigid ceiling of interconnected sloped and curved perforated baffles covering sludge blanket allowing the incoming water to pass on its surface minimizing sludge re-suspension and directing the flow on top of the blanket in the settling zone of the tank.

The baffle system consists of a plurality of perforated baffles interconnected and sloped in the direction of the flow for a specific length to allow drainage of the settled solids. The individual baffles forming the system have curved surfaces to allow drainage of the settled solids in the lateral direction and gas release and flow-through openings.

The individual baffles are supported from a circular feed well, center column and/or energy dissipating tub by separate vertical structural elements in case of circular tank. In case of rectangular or square tanks, the individual baffles are attached to the end wall by brackets or supporting elements.

In a currently preferred implementation, the individual baffles are fabricated from a molded reinforced fiberglass composite as one piece. Thus, each molded baffle incorporates curved surface with perforations. Most preferably, the thickness of the fiberglass panels is in the range from 3/16th to one inch, a range that provides structural integrity to the whole baffle system.

The features and advantages of the present invention will become apparent to those skilled in the art upon reading of the following detailed description when taken in conjunction with the drawings where there is shown an illustrative embodiment of the invention and the claims where there is indication of the scope of the invention.

BRIEF DESCRIPTION OF THE DRAWINGS

In the following detailed description, reference will be made to the attached drawings in which.

DETAILED DESCRIPTION OF THE INVENTION

Figure 1:
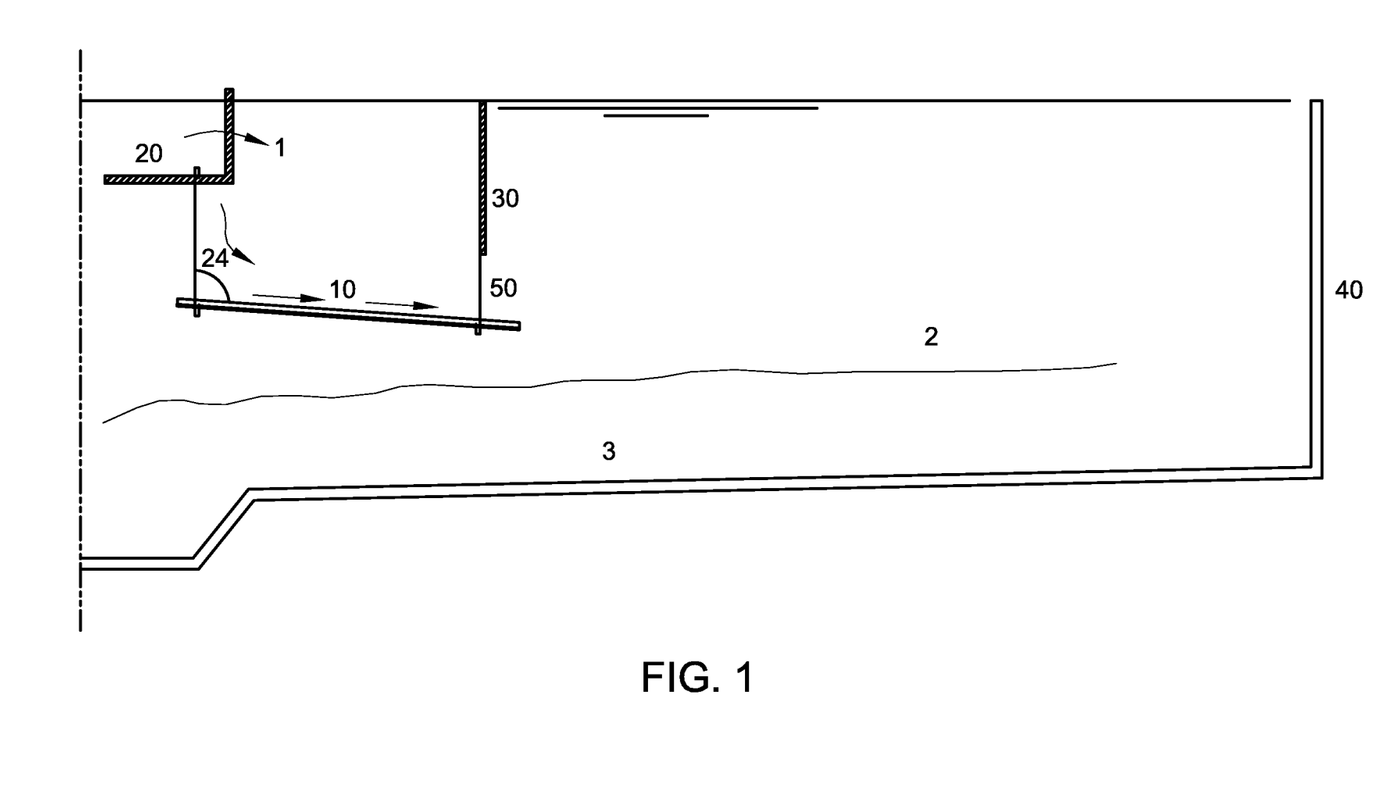
FIG. 1 is a perspective view of a sludge protector canopy baffle system supported by the energy dissipating tub and feed well in a circular tank.

Referring to the drawings and particularly to FIG. 1, there is illustrated a sludge protector canopy baffle system generally designated 10, of the present invention, which is supported to the energy dissipating tub 20 and feed well 30 sloped at angle 24 in a circular tank 40 through structural support elements 50. The slope angle 24 ranges between 60 degree to 120 degrees with vertical. The baffle system 10 divides the tank 40 into clear water zone 2 and sludge layer 3 protected from the incoming water 1.

Figure 2:
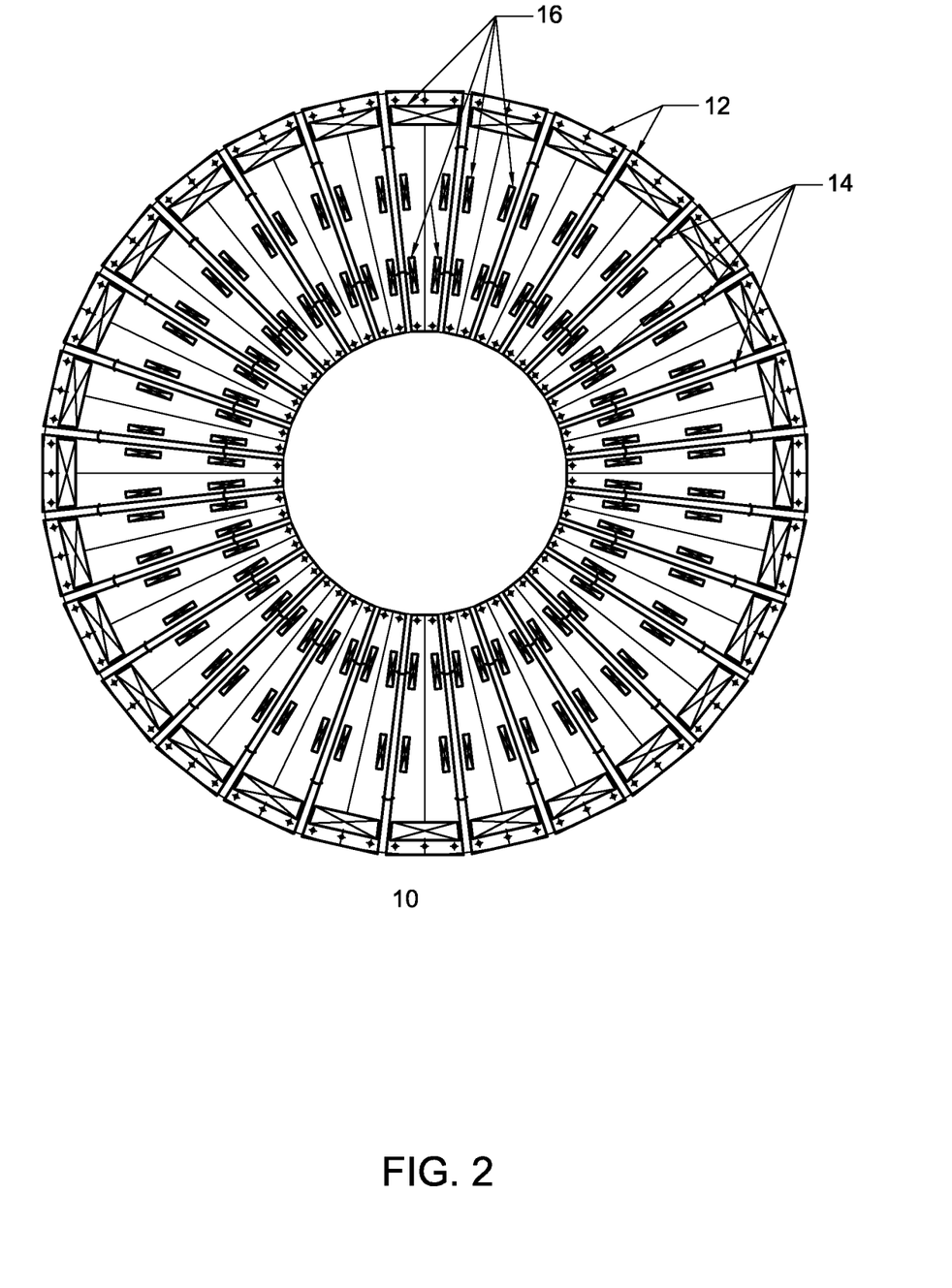
FIG. 2 is a perspective plan view of the sludge canopy baffle system comprising of interconnected baffles supported by the energy dissipating tub and feed well in a circular tank.

Referring to FIG. 2, there is illustrated a sludge protector canopy baffle system 10, its individual baffles 12, cross connectors 14 and surface openings 16.

Figure 3:
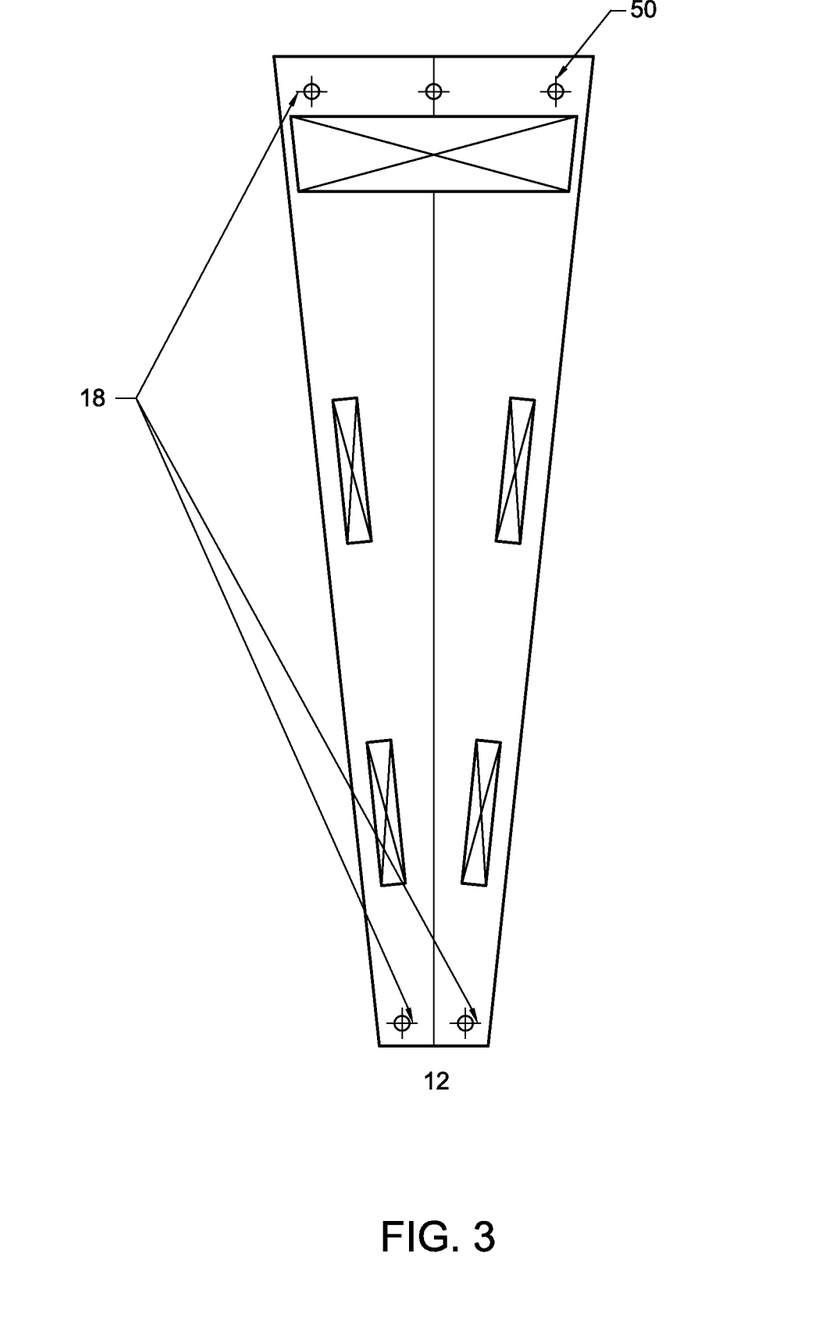
FIG. 3 is a detailed view of an individual baffle for circular tank.

Referring to FIG. 3, detailed view of individual baffle 12 is shown. Each baffle has surface openings 16. Width of each opening ranges between 2 inches to 64 inches. Length of each opening ranges between 2 inches to 24 inches. Mounting holes 18 to attach structural elements 50 are drilled on the edges of the baffle.

Figure 4:
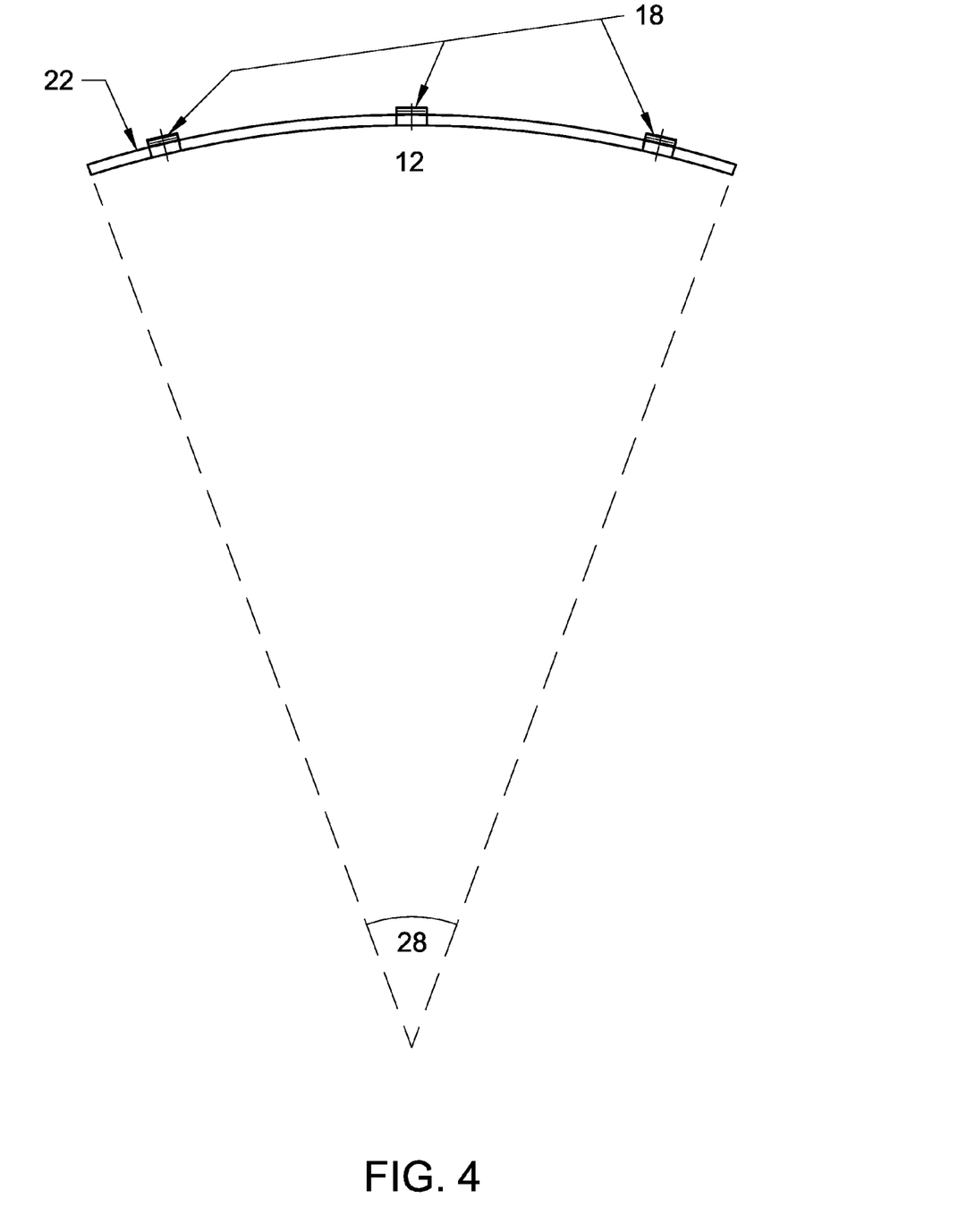
FIG. 4 is a detailed view of cross section of an individual baffle.

Referring to FIG. 4, detailed cross section of the individual baffle 12 and mounting holes 18 is shown. The thickness 22 ranges from 3/16th of inch to one inch. The surface curvature has a radial angle 28 ranges from 45 degrees to 180 degrees.

Figure 5:
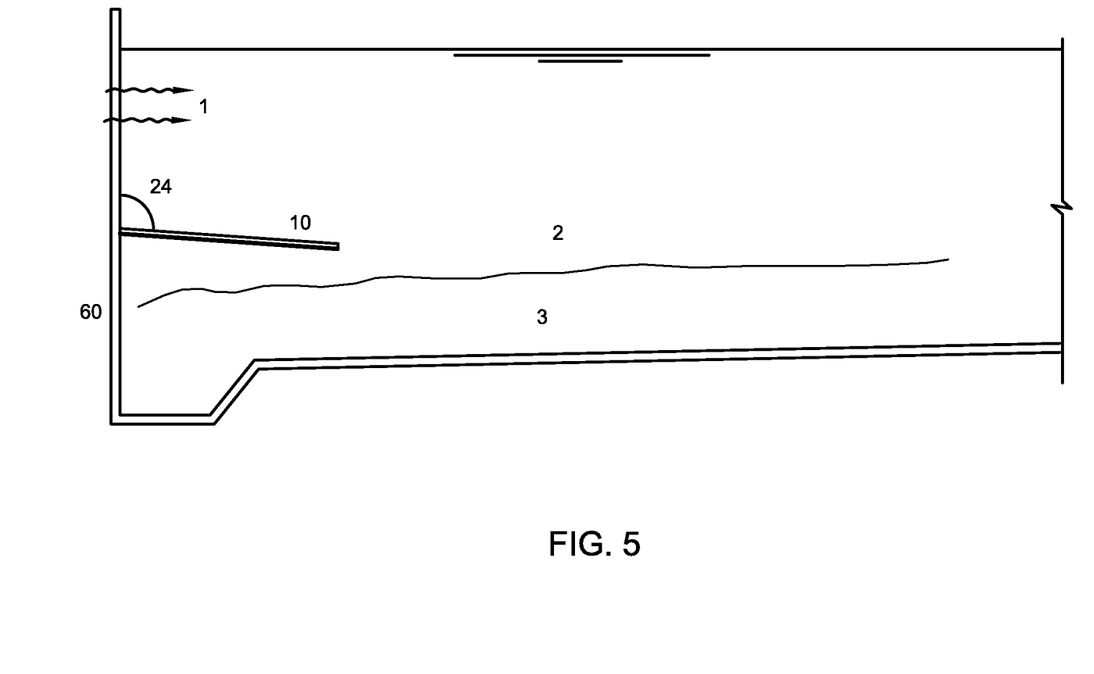
FIG. 5 is a perspective view of a sludge protector canopy baffle system mounted to the wall in a non-circular tank.

Referring to FIG. 5, there is illustrated the sludge protector canopy baffle system 10 mounted to wall in a non-circular tank 60 and sloped inside tank at an angle 24 dividing the tank into clear water zone 2 and sludge layer 3. The slope angle 24 ranges between 60 to 120 degrees with vertical.

Figure 6:
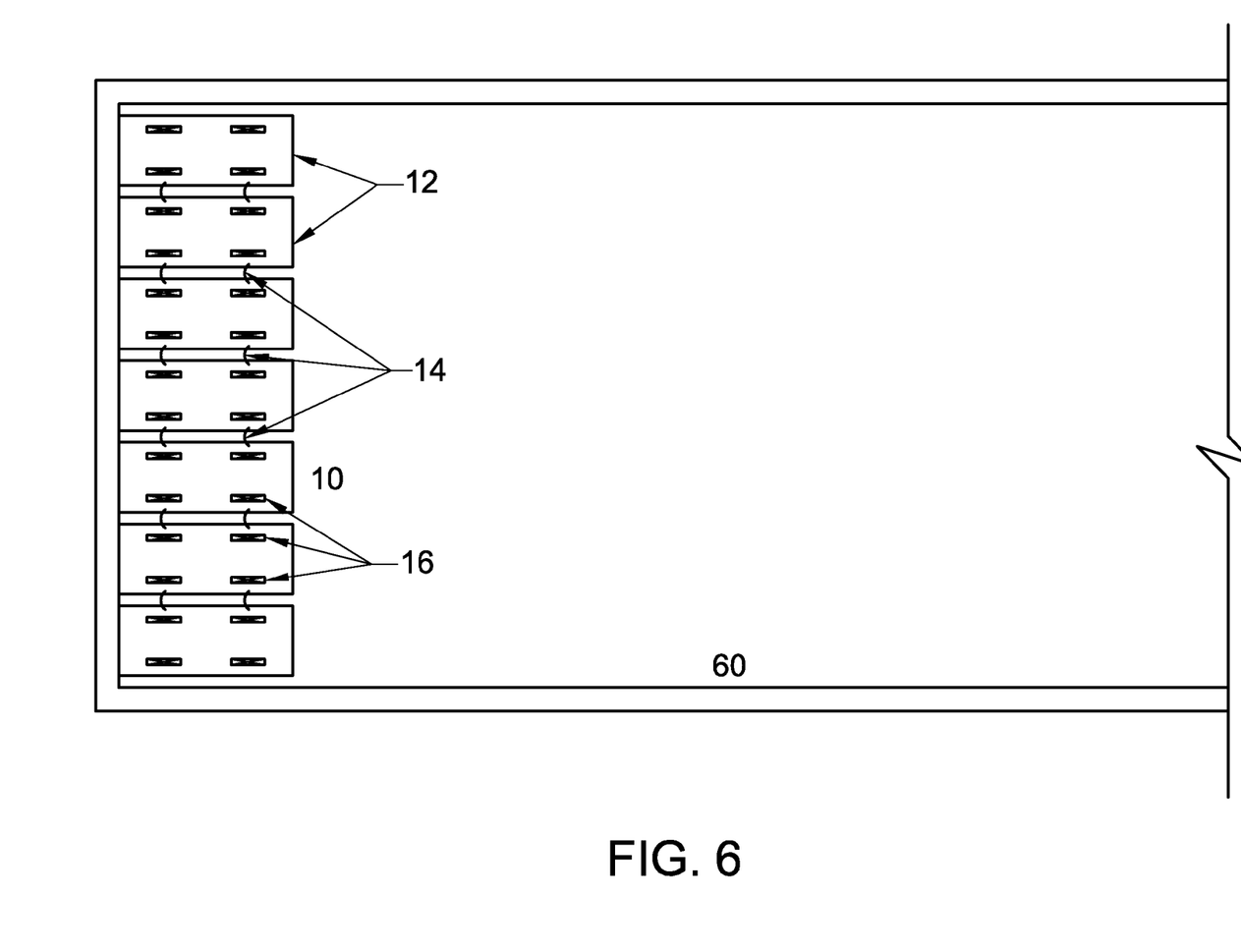
FIG. 6 is a perspective plan view of a sludge protector canopy baffle system mounted to the wall in a non-circular tank.

Referring to FIG. 6, there is illustrated a sludge protector canopy baffle system 10, its individual baffles 12, cross connectors 14 and surface openings 16 mounted to non circular tank 60.

Figure 7:
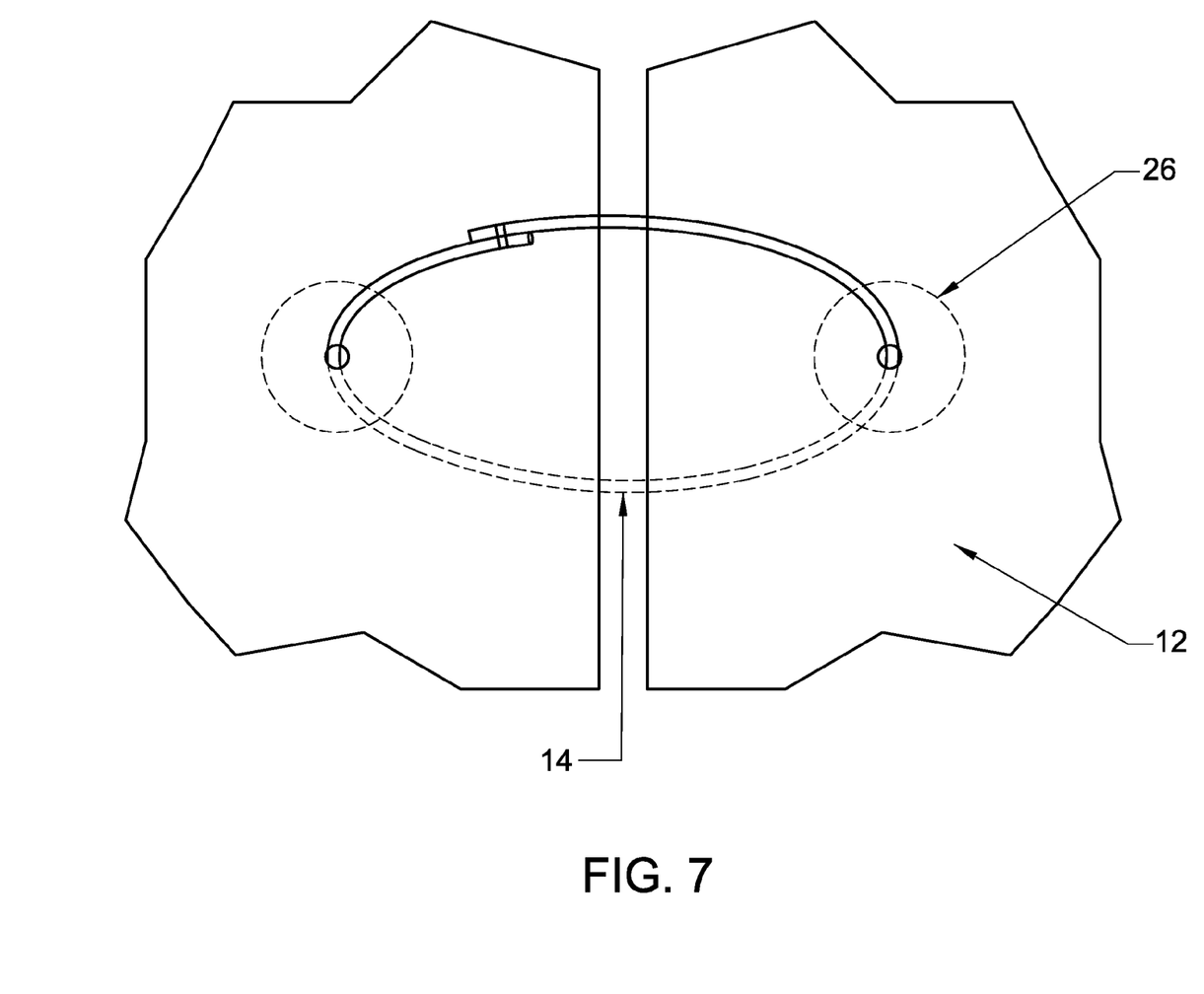
FIG. 7 is a detailed view of the cross connectors the baffles along the length.

Referring to FIG. 7, the cross connector 14, in one embodiment, includes a cable clamp and stainless steel washer 26.

What is claimed is:

1. An integrated sludge protector baffle system for use in a clarifier tank for gravitationally separating suspended matter from a liquid, said baffle system comprising:
    a plurality of perforated baffles configured for mounting within a clarifier tank having a bottom and at least one side wall bounding a liquid contained therein, each baffle of said plurality of perforated baffles being defined by opposing inward and outward edges, and opposing first and second lengthwise edges, and comprising:
        a sloped section configured to extend inside the clarifier tank,
        at least one surface having a surface curvature in a lateral direction such that the surface curvature extends from the first lengthwise edge to the second lengthwise edge, the at least one surface configured to curve downward towards the bottom of the clarifier tank, and
        one or more openings configured to allow drainage of solids, gas release and/or water flow,
    wherein the plurality of perforated baffles are configured to be secured together along their lengths in such a manner as to form a gap between adjacent baffles while forming a substantially rigid ceiling of baffles adapted to protect at least a portion of a lower sludge thickened layer in the clarifier tank, wherein each baffle of the plurality of perforated baffles is configured to be supported by one or more elements of the clarifier tank, wherein the plurality of perforated baffles are configured to divide the clarifier tank into an upper cleaner water layer and the lower sludge thickened layer, and wherein the plurality of perforated baffles are configured to minimize the amount of sludge re-suspended from the bottom of the clarifier tank when an incoming liquid enters the clarifier tank.

2. The baffle system of claim 1, wherein each baffle of the plurality of perforated baffles has a width of about 6 inches to 120 inches.

3. The baffle system of claim 1, wherein each baffle of the plurality of perforated baffles is about 12 inches to 240 inches in length.

4. The baffle system of claim 1, wherein each baffle of the plurality of perforated baffles is curved in a lateral cross section and has a radial angle from 45 to 180 degrees.

5. The baffle system of claim 1, wherein each baffle of the plurality of perforated baffles is configured to extend inside the clarifier tank at an angle of about 60 to about 120 degrees with the vertical.

6. The baffle system of claim 1, wherein the one or more openings comprises about 2 to about 10 surface openings.

7. The baffle system of claim 1, wherein each opening of the one or more openings is about 2 inches to about 24 inches in length.

8. The baffle system of claim 1, wherein each opening of the one or more openings is about 2 inches to about 64 inches in width.

9. The baffle system of claim 1, wherein each baffle of the plurality of perforated baffles is molded on a reinforced fiberglass composite.

10. The baffle system of claim 6, wherein each baffle of the plurality of perforated baffles has a thickness of about 3/16th of an inch to about one inch.

11. The baffle system of claim 1, wherein each baffle of the plurality of perforated baffles comprises stainless steel.

12. The baffle system of claim 1, wherein each baffle of the plurality of perforated baffles comprises one or more mounting holes configured to receive mounting bolts and form surface-to-surface engagement for securing each baffle of said plurality of perforated baffles to the one or more elements within the clarifier tank, wherein at least a portion of the one or more elements within the clarifier tank are spaced apart from the bottom and the at least one sidewall.

13. The baffle system of claim 1, wherein the clarifier tank comprises a circular tank.

14. The baffle system of claim 13, wherein the baffle system is supported from a clarifier center well, an energy dissipating tub, and/or a clarifier feedwell.

15. The baffle system of claim 13, wherein each baffle of the plurality of perforated baffles comprises an outward edge that is curved with a radius of curvature corresponding with a radius of curvature of the at least one side wall of the clarifier tank.

16. The baffle system of claim 12, wherein at least a portion of the one or more mounting holes are positioned adjacent to the inward edge and the outward edge.

17. The baffle system of claim 1, wherein each of the first and second lengthwise edges are longer than each of the inward and outward edges, wherein the one or more openings comprises a first and second opening, wherein a maximum width of each of the first and second openings extends in a direction substantially similar to the direction of extension of the outward edge, wherein a maximum length of each of the first and second openings extends in a direction substantially similar to the direction of extension of the first and/or second lengthwise edges, wherein the maximum width of the first opening is greater than the maximum length of the first opening, wherein the maximum length of the second opening is greater than the maximum width of the second opening.

18. An integrated sludge protector baffle system for use in a clarifier tank for gravitationally separating suspended matter from a liquid, said baffle system comprising:
 a plurality of baffles configured to be mounted within a clarifier tank having a bottom and at least one side wall, each baffle of said plurality of baffles being defined by opposing inward and outward edges, and opposing first and second lengthwise edges, and comprising:
  at least one surface having a surface curvature in a lateral direction such that the surface curvature extends from the first lengthwise edge to the second lengthwise edge, the at least one surface configured to curve downward towards the bottom of the clarifier tank,
  at least two openings sized differently from one another, the at least two openings configured to allow drainage of solids, gas release, and/or water flow, and
  one or more mounting holes configured to secure each baffle of the plurality of baffles to one or more structural members extending into the clarifier tank,
 wherein at least a portion of the one or more mounting holes are positioned adjacent to the inward edge and the outward edge.

19. The baffle system of claim 18, wherein each of the first and second lengthwise edges are longer than each of the inward and outward edges, wherein a maximum width of each of the first and second openings extends in a direction substantially similar to the direction of extension of the outward edge, wherein a maximum length of each of the first and second openings extends in a direction substantially similar to the direction of extension of the first and/or second lengthwise edges, wherein the maximum width of the first opening is greater than the maximum length of the first opening, wherein the maximum length of the second opening is greater than the maximum width of the second opening.

20. The baffle system of claim 18, wherein each baffle of the plurality of baffles further comprises a sloped section configured to extend inside the clarifier tank at an angle of about 60 to about 120 degrees with the vertical.

* * * * *